Figure 1:
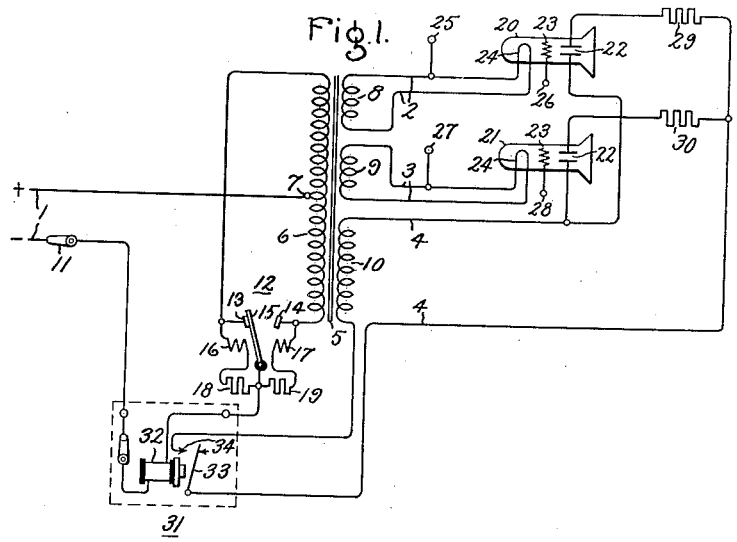

Jan. 9, 1940.    A. BIGALKE    2,186,473
ELECTRIC PROTECTIVE SYSTEM
Filed Jan. 18, 1939

Inventor:
Alfred Bigalke,
by Harry E. Dunham
His Attorney.

Patented Jan. 9, 1940

2,186,473

UNITED STATES PATENT OFFICE 2,186,473

ELECTRIC PROTECTIVE SYSTEM

Alfred Bigalke, Berlin-Karlshorst, Germany, assignor to General Electric Company, a corporation of New York Application January 18, 1939, Serial No. 251,637
In Germany January 12, 1938

11 Claims. (Cl. 171—97)

My invention relates to electric translating apparatus and more particularly to protective systems for electric inverters.

Frequently, it is desirable to effect transformation of direct current into alternating current by means of apparatus which is of rugged construction and which is susceptible of general application. For example, it is frequently desirable to furnish alternating current for the energization of alternating current apparatus from direct current systems by means of inverting apparatus of the vibratory type. In accordance with the teachings of my invention described hereinafter, I provide new and improved protective systems for electric inverters in which the duty imposed on the inverters during a starting operation is substantially reduced, thereby increasing the life of the inverter.

It is an object of my invention to provide new and improved electric translating apparatus.

It is another object of my invention to provide new and improved protective systems for electric inverters for transmitting power from direct current circuits to alternating current circuits.

It is a further object of my invention to provide new and improved protective systems for electric inverters of the vibratory type.

In accordance with the illustrated embodiments of my invention, I provide new and improved protective systems for electric inverters such as inverters of the vibratory type comprising contact making and breaking mechanism which controls an associated transformer to produce alternating electromotive forces. The inverter energizes a plurality of alternating current load circuits, at least one of which energizes the filamentary or thermionic cathode of an electric discharge device and another of which energizes the principal electrodes of the electric discharge device. Due to the positive temperature coefficient of resistance of the thermionic cathode, the current consumed by the cathode when it is cold is substantially greater than that consumed when the temperature reaches a safe operating value. Accordingly, the duty imposed on the vibratory contact mechanism is substantially greater during the starting operation. In order to relieve this duty, I provide a suitable time delay means which delays the energization of the load circuit associated with the principal electrodes for a predetermined interval of time to permit the cathode of the electric discharge device to assume a suitable operating temperature. More specifically, in one embodiment of my invention I provide a time delay relay connected in series relation with the primary winding of the transformer for delaying the closure of the circuit associated with the principal electrodes of the electric discharge device for a predetermined interval of time to permit the cathodes to assume a safe operating temperature. In another embodiment of my invention, I provide a time delay relay connected across a secondary winding of the transformer to delay the closure of the associated load circuit. In a still further embodiment of my invention, I provide a suitable impedance element connected in circuit with a secondary winding of the transformer and having a negative temperature coefficient of resistance in order to maintain the current transmitted by that winding below a predetermined value for a definite interval of time, so that the load imposed upon the vibratory contact mechanism is maintained at a suitable value during starting operations.

Figure 2:
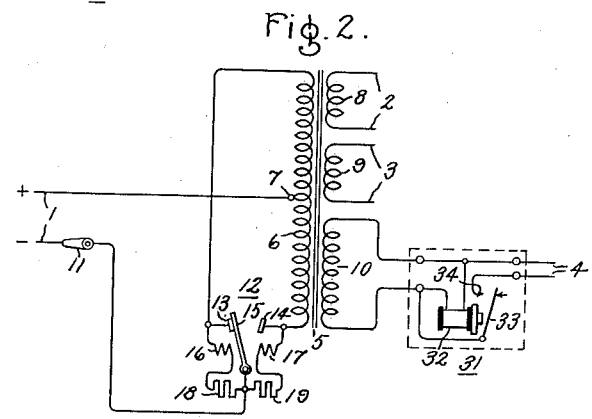
Figure 3:
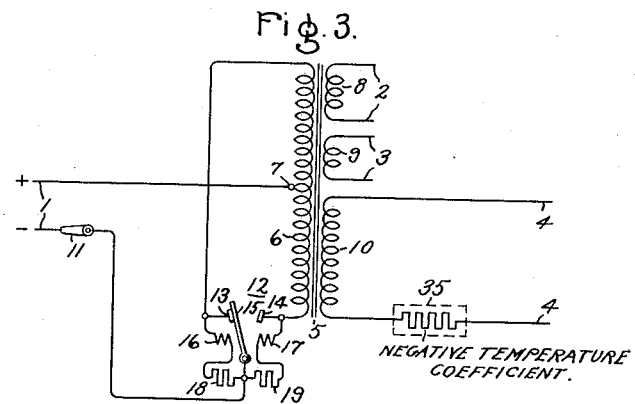

For a better understanding of my invention, reference may be had to the following description taken in connection with the accompanying drawing, and its scope will be pointed out in the appended claims. Fig. 1 diagrammatically illustrates an embodiment of my invention as applied to an electric valve inverter of the vibratory type for effecting energization of a pair of cathode ray oscillographs and in which the time delay relay is connected in circuit with the primary winding of the associated transformer. Fig. 2 diagrammatically illustrates another embodiment of my invention in which the time delay relay is connected across the terminals of one of the secondary windings; and Fig. 3 diagrammatically illustrates another embodiment of my invention in which an impedance having a negative temperature coefficient is connected in circuit with one of the associated load circuits to relieve the duty imposed upon the contact mechanism.

Referring now more particularly to Fig. 1 of the drawing, I have diagrammatically illustrated my invention as applied to an inverter for transmitting power from a direct current circuit 1 to a plurality of alternating current circuits 2, 3 and 4. The inverter may be of the type employing a transformer 5 comprising a primary winding 6 having an electrically intermediate connection 7 and a plurality of secondary windings 8, 9 and 10 associated with alternating current load circuits 2, 3 and 4, respectively. A suitable circuit controlling or initiating means, such as a switch 11, may be connected in series relation with the inverter. In order to effect alternate energization of the upper and lower portions of the primary winding 6 and to induce in the secondary windings 8, 9 and 10 alternating electromotive forces, I provide a suitable means such as a vibratory contact mechanism 12 comprising stationary contacts 13 and 14, a vibrating contact 15, actuating coils 16 and 17, and resistances 18 and 19 which are connected in series relation with the actuating coils 16 and 17.

In the use of electric discharge devices, such as cathode ray oscillographs, it is frequently desirable to provide a plurality of independent alternating current load circuits and to effect energization of these load circuits from a direct current source. For example, where it is desired to observe a number of different electrical or other phenomena by means of cathode ray oscillographs, it is frequently desirable to maintain the potentials of the cathodes at different values which, of course, involves the necessity of employing separate and independent alternating current circuits. Cathode ray oscillographs 20 and 21 are connected to be energized from the inverter and each comprises a pair of principal electrodes, such as deflecting plates 22, a grid 23 and a filamentary or thermionic cathode 24. The electrical quantity, which varies as the electrical condition or other phenomena to be observed, may be impressed upon the circuits for cathode ray oscillographs 21 and 22 by means of contacts 25, 26, 27, and 28. Current controlling or limiting resistances 29 and 30 may be connected in series relation with the deflecting plates 22 of cathode ray oscillographs 20 and 21. Furthermore, the deflecting plates of the cathode ray oscillographs are connected to be energized from the alternating current load circuit 4 which, in turn, is energized from the secondary winding 10 of transformer 5.

Inasmuch as the filamentary or thermionic cathodes 24 of the cathode ray oscillographs 20 and 21 are characterized by having positive temperature coefficients of resistance, upon starting the system the currents conducted by the cathodes 24 will be substantially greater than the value which flows after the cathodes have assumed a suitable operating temperature. Accordingly, during the starting operation the load imposed on the inverter is substantially greater than that which is imposed during normal operation of the system.

In order to relieve the duty imposed on the contact mechanism 12 during the starting operation and until the temperature of the cathodes 24 have assumed a suitable operating temperature, I provide a suitable time delay means such as a time delay relay 31 comprising an actuating coil 32, an armature 33 and a contact 34 which, cooperating with the armature 33, controls the energization of the alternating current load circuit 4. The actuating coil 32 is connected in circuit with the primary windings 6 of transformer 5.

The operation of the embodiment of my invention diagrammatically illustrated in Fig. 1 will be explained by considering the system when alternating current is supplied to the load circuits 2, 3 and 4 from the direct current supply circuit 1. As will be understood by those skilled in the art, the movable member 15 of the contact mechanism 12 vibrates between the positions in which contact is made with stationary contacts 13 and 14 to energize alternately the upper and lower portions of primary winding 6 of transformer 5, thereby inducing in secondary windings 8, 9 and 10 alternating electromotive forces. The operation of the system is initiated by the closure of switch 11. The contact mechanism 12 is initially brought into operation, effecting substantially instantaneous energization of the load circuits 2 and 3. However, load circuit 4 is not energized immediately, due to the fact that armature 33 is in the position indicated, maintaining the circuit 4 in a deenergized condition. After the lapse of a predetermined interval of time, armature 33 is moved to engage contact 34, thereby completing the circuit for load circuit 4 and energizing the circuit for the principal electrodes 22 of cathode ray oscillographs 20 and 21. The relay 31 is adjusted to afford a period of time delay corresponding to the time required for the cathodes 24 to assume a safe operating temperature. Consequently, at the time the relay 31 operates to close circuit 4, the resistance of the cathodes 24 has increased to a value to reduce the current consumed so that circuit 4 may be closed without imposing on the vibratory contact mechanism 12 an inordinate load. In other words, the energization of at least one of the load circuits is delayed so that the current imposed on the vibratory contact mechanism 12 does not cause excessive sparking at the contacts.

Fig. 2 diagrammatically illustrates another embodiment of my invention which is similar in many respect to that shown in Fig. 1 and corresponding elements have been assigned like reference numerals. The cathode ray oscillographs 20 and 21 or other electric discharge device may be energized from secondary windings 8 and 9. In Fig. 2, the time delay relay 31 is shown as being connected across the secondary winding 10 to delay energization of the load circuit 4 for a predetermined interval of time after the energization of the transformer 5. The embodiment of my invention shown in Fig. 2 operates in substantially the same manner as that explained above in connection with Fig. 1. Upon closure of the switch 11, the system is initiated in its operation, inducing alternating electromotive forces in windings 8, 9 and 10. The energization of the load circuit 4 is delayed for a predetermined interval of time after the energization of transformer 5 by the operation of the time delay relay which delays the closing of circuit 4 to relieve the duty on the contacts of the mechanism 12.

Fig. 3 diagrammatically illustrates a still further embodiment of my invention as applied to a system of the type shown in Fig. 1, and corresponding elements have been assigned like reference numerals. As a means for delaying the energization of one of the associated alternating current load circuits and as a means for relieving the duty imposed on the contacts of the mechanism 12 during starting operations, I provide a suitable impedance element such as resistance 35 having a negative temperature coefficient of resistance to maintain the current transmitted to the load circuit 4 below a predetermined value for a sufficient interval of time to permit the cathodes of the associated electric discharged devices to assume a safe operating temperature, and to delay the energization of at least one of the load circuits until the current consumed by the cathodes decreases to the desired value. In this manner, the load imposed on the inverter is substantially reduced during the starting operation and prevents excessive sparking at the contacts of the mechanism 12, and the life of the vibratory contact mechanism and the life of the inverter are substantially increased.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a direct current supply circuit, a plurality of alternating current load circuits, an inverter connected between said supply circuit and said alternating current circuits and comprising a transformer having a primary winding and a plurality of secondary windings each associated with a different one of said load circuits and means for effecting energization of said primary winding from said supply circuit to induce in said secondary windings alternating electromotive forces, means connected to at least one of said load circuits, the aggregate initial load of said plurality of load circuits being in excess of the safe operating capacity of said inverter, and means for delaying the energization of another of said load circuits for a predetermined interval of time after the initiation of the operation of said inverter to relieve the starting duty on said inverter.

2. In combination, a direct current supply circuit, a plurality of alternating current load circuits, an inverter connected between said supply circuit and said alternating current circuits and comprising a transformer having a primary winding and a plurality of secondary windings each associated with a different one of said load circuits and means for effecting energization of said primary winding from said supply circuit to induce in said secondary windings alternating electromotive forces, means connected to at least one of said load circuits and having a positive temperature coefficient, the aggregate initial load of said plurality of load circuits being in excess of the safe operating capacity of said inverter, and means for delaying the energization of another of said load circuits for a predetermined interval of time after the initiation of the operation of said inverter to relieve the duty on said inverter.

3. In combination, a direct current supply circuit, a plurality of alternating current load circuits, an inverter of the vibratory type connected between said supply circuit and said alternating current circuits and comprising a vibrating contact making and breaking means and a transformer having a primary winding connected to be energized from said supply circuit and having a plurality of secondary windings each associated with a different one of said load circuits, the aggregate initial load of said plurality of load circuits being in excess of the safe operating capacity of said inverter, and means for delaying the energization of at least one of said alternating current load circuits for a predetermined interval of time after the energization of said inverter.

4. In combination, a direct current supply circuit, a plurality of alternating current load circuits, an inverter of the vibratory type connected between said supply circuit and said load circuits and comprising a transformer having a primary winding and a plurality of secondary windings each associated with a different one of said load circuits and a vibrating contact making and breaking means for energizing said primary winding from said direct current circuit, an electric discharge device having a filamentary cathode energized from one of said load circuits, the aggregate initial load of said plurality of load circuits being in excess of the safe operating capacity of said inverter, and means for delaying the energization of one or the other of said load circuits for a predetermined interval of time after the initiation of the energization of said inverter.

5. In combination, a direct current supply circuit, a plurality of alternating current load circuits, electric translating apparatus connected between said supply circuit and said load circuits and comprising a transformer having a primary winding and a plurality of secondary windings each associated with a different one of said load circuits and a vibrating contact mechanism for effecting energization of said primary winding from said supply circuit to generate in said secondary windings alternating electromotive forces, the aggregate initial load of said plurality of load circuits being in excess of the safe operating capacity of said inverter, and time delay means connected in one of said load circuits to delay the energization of said one circuit for a predetermined interval of time after the initiation of the energization of said primary winding.

6. In combination, a direct current supply circuit, a pair of alternating current load circuits, electric translating apparatus connected between said supply circuit and said load circuits and comprising an inverter of the vibratory type including a transformer having a primary winding and a pair of secondary windings each associated with a different one of said load circuits and a contact mechanism for energizing said primary winding from said supply circuit, an electric discharge device having a filamentary cathode connected to be energized from one of said load circuits, the aggregate initial load of said plurality of load circuits being in excess of the safe operating capacity of said inverter, and means for delaying the energization of the other load circuit for a predetermined interval of time after the energization of said one load circuit.

7. In combination, a direct current supply circuit, a plurality of alternating current load circuits, an inverter connecting said supply circuit and said load circuits and comprising a transformer having a primary winding and a plurality of secondary windings each associated with a different one of said load circuits and means for effecting energization of said primary winding from said supply circuit to induce in said secondary windings alternating electromotive forces, means connected to at least one of said load circuits and having a positive temperature coefficient, the aggregate initial load of said plurality of load circuits being in excess of the safe operating capacity of said inverter, and means connected to said supply circuit to delay the energization of another of said load circuits for a predetermined interval of time after the initiation of the operation of said inverter to relieve the duty on said inverter.

8. In combination, a direct current supply circuit, a plurality of alternating current load circuits, an inverter connecting said supply circuit and said load circuits and comprising a transformer having a primary winding and a plurality of secondary windings each associated with a different one of said load circuits and means for effecting energization of said primary winding from said supply circuit to induce in said secondary windings alternating electromotive forces, means connected to at least one of said load circuits and having a positive temperature coefficient, the aggregate initial load of said plurality of load circuits being in excess of the safe operating capacity of said inverter, and means connected in series relation with at least a portion of said primary winding for delaying the energization of another of said load circuits for a predetermined interval of time after the initiation of the operation of said inverter to relieve the starting duty on said inverter.

9. In combination, a direct current supply circuit, a plurality of alternating current load circuits, an inverter connecting said supply circuit and said load circuits and comprising a transformer having a primary winding and a plurality of secondary windings each associated with a different one of said load circuits and means for effecting energization of said primary winding from said supply circuit to induce in said secondary windings alternating electromotive forces, means connected to at least one of said load circuits and having a positive temperature coefficient, the aggregate initial load of said plurality of load circuits being in excess of the safe operating capacity of said inverter, and means connected across another of said load circuits for delaying the energization thereof for a predetermined interval of time after the initiation of the operation of said inverter to relieve the duty on said inverter.

10. In combination, a direct current supply circuit, a plurality of alternating current load circuits, an inverter connected between said supply circuit and said load circuits and comprising a transformer having a primary winding and a plurality of secondary windings each associated with a different one of said load circuits and means for effecting energization of said primary winding from said supply circuit to induce alternating electromotive forces in said secondary windings, an electric discharge device comprising control electrodes and a thermionic cathode, said thermionic cathode being connected to one of said secondary windings and having a positive temperature coefficient and said control electrodes being connected to be energized from another of said load circuits, and means for delaying the energization of said last mentioned load circuit for a predetermined interval of time after the initiation of the operation of said inverter to relieve the duty imposed on said inverter.

11. In combination, a direct current supply circuit, a plurality of alternating current load circuits, an inverter connected between said supply circuit and said load circuits and comprising a transformer having a primary winding and a plurality of secondary windings each associated with a different one of said load circuits and a contact mechanism for energizing said primary winding from said supply circuit to induce in said secondary windings alternating electromotive forces, a plurality of electric discharge devices each comprising control electrodes and a thermionic cathode, said thermionic cathodes being energized from different load circuits and said control electrodes being energized from another of said load circuits, and means for delaying the energization of said last mentioned load circuit for a predetermined interval of time after the initiation of the operation of said inverter.

ALFRED BIGALKE.